United States Patent Office 2,926,159
Patented Feb. 23, 1960

2,926,159

METHOD OF CHLORINATION OF POLYOLEFINS

John S. Tinsley, New Brunswick, N.J., assignor to Hercules Powder Company, Wilmington, Del., a corporation of Delaware No Drawing. Application February 12, 1959
Serial No. 792,698

5 Claims. (Cl. 260—88.2)

This invention relates to the chlorination of polyolefins and more particularly to the chlorination of polyethylene and polypropylene and copolymers thereof in the solid state.

It is already known in the art to chlorinate uncompacted solid polyethylene suspended in water at a temperature of 10° C. to 100° C. in a state of agitation while irradiating with actinic light. The chlorination must be started at a low temperature and the rate of chlorination kept low until a chlorine content above about 35–42% is attained to avoid agglomeration of the partially chlorinated polyethylene which takes place above about 65° C.

In accordance with the present invention it has now been found that polyolefins are chlorinated more rapidly and efficiently without agglomeration at temperatures above about 65° C. when the chlorination is carried out by contacting the polyolefin while agitating in suspension in concentrated aqueous hydrochloric acid at a temperature in the range of 65° C. to 105° C.

It is particularly advantageous to use aqueous hydrochloric acid saturated with hydrochloric acid at the temperature of chlorination in the initial stages of chlorination so as to avoid side reactions which lower the sintering temperature and cause agglomeration and compaction with resultant lowering of the surface area where chlorination takes place. Under the conditions of the present invention, the polyolefin particles undergo surface chlorination and, in the absence of sintering, the surface swells and sloughs off constantly exposing thereby a fresh surface for chlorination. Chlorination thus proceeds to a high chlorine content rapidly and efficiently.

The process of this invention is more particularly described in the following examples in which all parts and percentages are by weight.

Examples 1–6

A saturated (22% by weight) aqueous hydrochloric acid solution was placed in a chlorination vessel. To 3880 parts of this hydrochloric acid was added 182 parts uncompacted polyethylene flake (at least 50% passing 250 mesh). This mixture was then agitated rapidly and irradiated with ultraviolet light while chlorine gas was introduced into the aqueous hydrochloric acid at the rate of 100 parts per hour. The temperature was controlled by heating with a water bath or an electric mantle. The chlorination was repeated at 80°, 85°, 90°, 100° and 105° C. and in each case was continued for 7 hours. The products were freed of acid by washing the granules with water. Analyses of the products were as follows:

| Example | 1 | 2 | 3 | 4 | 5 | 6 |
|---|---|---|---|---|---|---|
| Chlorination Temp. (° C.) | 70 | 80 | 85 | 90 | 100 | 105 |
| Chlorine in Product | 56 | 62 | 61 | 58 | 49 | 47 |

In the chlorinations carried out at 100° and 105° C. before the chlorine content had reached 45%, the products agglomerated slightly and thus reduced the surface available for chlorination so that the final chlorine content was greatly reduced. Very little chlorination occurred after about 45% chlorine had been introduced and agglomeration took place.

The polyethylene used in the chlorination process of Examples 1–6 was in the form of small uncompacted particles (16 to 250 mesh, U.S. sieve) as it is when produced by the well known commercial Ziegler polymerization process for production of high density polyethylene. This high density polyethylene had a molecular weight of 140,000 and was crystalline. Similar results were obtained with samples of polyethylene having molecular weights in the range of from 80,000 to 250,000 and RSV in the range from 1.4 to 3.2.

Example 7

Crystalline polypropylene flake (182 parts) of molecular weight in the range of 800,000 to 900,000 as obtained in the Ziegler process of polymerization was slurried with 3638 parts of 27% hydrochloric acid (sp. gr.=1.1369) in a chlorination vessel fitted with a glass wall through which ultraviolet radiation was introduced from a mercury vapor lamp. The temperature was raised to 74–76° C. and chlorine gas was introduced at the rate of 100 parts by weight per hour for 1 hour and then at the rate of 200 parts by weight per hour for 13.5 hours. The chlorinated polymer was separated by filtration, washed thoroughly with water and then dried in air at 60° C. The chlorine content of the product was 60.2%. The chlorinated linear polypropylene was insoluble in methylene chloride, hexane, butyl acetate, and ethyl alcohol.

Example 8

Following the procedure of Example 7 a copolymer of ethylene and propylene obtained by polymerizing a 1:10 mixture of ethylene and propylene by means of a Ziegler catalyst in which the reagents were $TiCl_4$ and aluminum triethyl was substituted for the polypropylene. The temperature of chlorination was 71 to 79° C., and chlorination was continued for 12 hours. The product after filtering and washing thoroughly with water had a chlorine content of 54.6%. It resembled chlorinated polypropylene in stability and insolubility characteristics.

The hydrochloric acid solution is usually obtained by passing chlorination off-gas low in free chlorine into water until saturated. This may be done at any suitable temperature at or below the temperature to be used in the chlorination since the excess hydrogen chloride contained therein will be distilled off when the temperature is raised. The hydrochloric acid may be reused until it becomes contaminated with extraneous impurities, such as metal salts picked up from the equipment, or such as decomposed organic matter. Recycled hydrochloric acid solution is generally of the proper concentration for reuse without addition of hydrogen chloride; but, if not, additional hydrogen chloride can be added to bring the concentration up to the desired value. The range of concentration of the aqueous hydrochloric acid is 20% to 28%.

Since the solubility of chlorine is quite low in the aqueous concentrated hydrochloric acid used in this process, there is no induction period in the starting of chlorination of the polymer.

The ratio of polyolefin to the aqueous hydrochloric acid solution is selected so as to produce a slurry that can be readily agitated throughout the chlorination. Since the chlorination process increases the volume of solids, the determining ratio is that after chlorination is complete. This ratio may be in the range of 0.5/100 to 10/100. The optimum ratio is in the range of 0.5/100 to about 7.5/100.

Agitation is required for good contacting of the polyolefin with the chlorine and may be provided by a rapid stirrer or other agitation device that does not press or compact the polyolefin granules.

The actinic light for catalyzing the chlorination may be provided by any generator of light in the 2500–6000 A. range. Mercury vapor lamps or fluorescent lamps providing light in this range may be used. While a catalyst is preferable, it is not necessary since chlorination takes place slowly without the catalyst.

The chlorination of polyolefins in suspension in concentrated hydrochloric acid is ordinarily carried out at a temperature in the range of 65° C. to 105° C. and preferably between about 75° C. and 85° C. In order to maintain a high efficiency of chlorination, the temperature should be kept in the range of 75° C. to 95° C. until the average chlorine content of the product has reached about 50%. For the production of chlorinated polyolefins of chlorine content above about 50%, the chlorination is continued on the chlorinated polyolefin of lower chlorine content at a temperature in the range of about 95 to 105° C. The danger of sintering of the material being chlorinated is much less when chlorination is carried out in concentrated hydrochloric acid saturated with hydrogen chloride and the sintering temperature is much higher so that above about 50% chlorine, the temperature may be raised as high as 105° C. for completion of the chlorination without loss of efficiency.

The chlorinated polyolefin does not agglomerate in the process of this invention as it does in the early stages of chlorination where water alone is used as the chlorination medium. In a saturated hydrochloric acid solution, the reaction of chlorine with water is suppressed and dehydrohalogenation of the chlorinated polyolefin is also suppressed. The chlorination thus takes place normally as in the absence of water, and there is no breakdown of the chlorinated product which leads to agglomeration.

The process of this invention is particularly useful in the chlorination of high density polyethylene and polypropylene which are difficult to chlorinate due to sintering of the surface. However, the process is equally useful in the chlorination of low density polyethylene.

The polymers used in the chlorination process of this invention are more uniformly chlorinated if the thickness of material to be penetrated by the chlorine is low. Thus, material 1 mil thick will chlorinate more uniformly than material 10 mils thick particularly when chlorinating to the high chlorine content range. This is particularly the case when a continuous or chopped sheet of material is subjected to the chlorination process. Usually the commercial polymer is in the form of flakes or small uncompacted particles, and here the walls are on the average less than 1 mil thick, and such particles or flakes chlorinate much more uniformly than a compacted particle, such as a molding powder, of the same physical dimensions. The polymer may also be chlorinated in the form of crushed or ground particles such as result from the crushing, grinding or sawing of larger pieces of polymer. The polymer used is preferably the uncompacted polymer in the form obtained in the Ziegler polymerization or the precipitate obtained in the solution polymerization processes. Such particles are granular flakes and have a high internal surface and have a bulk density ranging from 20 to 30 lb. per cubic foot and averaging about 25 lb. per cubic foot.

The reduced specific viscosity (RSV) values set forth herein were determined by the standard procedure using a 0.1% (weight/volume) solution of the polymer in decahydronaphthalene containing a small amount of phenyl β-naphthylamine as a stabilizer at a temperature of 135° C.

The chlorinated polyolefins of this invention are insoluble in hexane, ethanol, butyl acetate, toluene, xylene, carbon tetrachloride, methyl ethyl ketone and methylene chloride and are useful as molding powders and in fibers, sheets, films, rods and tubes from which various articles may be produced. They are also useful as flameproofing additives for other plastics and for improving flexibility of other chlorinated plastics such as polyvinyl chloride.

What I claim and desire to protect by Letters Patent is:

1. The process of chlorinating a polyolefin of the group consisting of polyethylene, polypropylene, and copolymers of ethylene and propylene which comprises contacting said polyolefin in suspension in a saturated aqueous solution of hydrogen chloride at a temperature in the range of 65° to about 105° C. with chlorine gas while agitating and irradiating with light in the 2500–6000 A. range until a polymer having a chlorine content of at least 5% is obtained.

2. The method of claim 1 wherein the polyolefin is polyethylene.

3. The method of claim 1 wherein the polyolefin is polypropylene.

4. The method of claim 1 wherein the polyolefin is a copolymer of ethylene and propylene.

5. The process of claim 1 wherein the weight ratio of chlorinated polymer to the saturated aqueous solution of hydrogen chloride at the termination of chlorination is from 0.5 to 10 parts of the former to 100 parts of the latter.

References Cited in the file of this patent

UNITED STATES PATENTS

| | | |
|---|---|---|
| 2,398,803 | Myles et al. | Apr. 23, 1946 |
| 2,405,971 | McAlevy | Aug. 20, 1946 |
| 2,481,188 | Babayan | Sept. 6, 1949 |
| 2,503,252 | Ernsberger | Apr. 11, 1950 |

FOREIGN PATENTS

| | | |
|---|---|---|
| 575,096 | Great Britain | Feb. 4, 1946 |

UNITED STATES PATENT OFFICE

CERTIFICATE OF CORRECTION

Patent No. 2,926,159                 February 23, 1960

John S. Tinsley

It is hereby certified that error appears in the printed specification of the above numbered patent requiring correction and that the said Letters Patent should read as corrected below.

Column 1, line 69, in the table, first column thereof, after "Product" insert -- (%) --.

Signed and sealed this 9th day of August 1960.

(SEAL)
Attest:

KARL H. AXLINE
Attesting Officer

ROBERT C. WATSON
Commissioner of Patents